United States Patent [19]

Terranova

[11] Patent Number: 4,773,705
[45] Date of Patent: Sep. 27, 1988

[54] BICYCLE SEAT

[76] Inventor: Joseph M. Terranova, 220 Haverhill St., North Reading, Mass. 01864

[21] Appl. No.: 65,294

[22] Filed: Jun. 22, 1987

[51] Int. Cl.4 .............................................. B62J 1/00
[52] U.S. Cl. ..................................... 297/195; 297/214
[58] Field of Search ............... 297/195, 214, 198, 202, 297/201

[56] References Cited

U.S. PATENT DOCUMENTS

| | | | |
|---|---|---|---|
| 2,188,153 | 1/1940 | Mesinger | 297/198 |
| 3,874,730 | 4/1975 | Marchello | 297/202 |
| 4,098,537 | 7/1978 | Jacobs | 297/195 |
| 4,387,925 | 1/1983 | Barker et al. | 297/195 X |
| 4,429,915 | 2/1984 | Flagler | 297/195 X |
| 4,662,677 | 5/1987 | Hughes | 297/195 |

Primary Examiner—James T. McCall
Attorney, Agent, or Firm—Edward A. Gordon

[57] ABSTRACT

An improved bicycle seat which is useful for various styles of riding formed of an elongated integral member having a top surface, a bottom surface, a center portion and a pair of lateral end portions. The top surface is contoured to have a pair of concave portions for supporting engagement with each of a bicycle rider's buttocks. The bicycle seat also includes a pair of seat supporting frame members. Each of the frame members is a mirror image of the other and includes a u-shaped rod member having a pair of generally parallel laterally extending leg portions for supporting engagement with the bottom surface of the seat and a closed end portion bent downwardly and generally perpendicular to the leg portions to provide a pair of support members. The supporting members are laterally adjustable as well as constructed and arranged for attachment to a standard bicycle seat mounting apparatus.

15 Claims, 3 Drawing Sheets

BICYCLE SEAT

FIELD OF THE INVENTION

The present invention relates generally to bicycle seats and more particularly to a new and improved seat and supporting structure which is useful to various styles of riding as well as adaptable to the standard structure for mounting the seat upon conventional bicycle frames.

BACKGROUND OF THE INVENTION

Bicycles have been in use for many years throughout the world as a means of transportation for short trips, recreation, exercise and sports competition. Over the course of many years of the bicycle's existance, there have been many structural changes streamlining its design and improving its efficiency. The result is today we have sleek, light weight and fast bicycles which are capable of efficiently transferring the energy from the bicycle rider's legs to the wheels of the bicycle. Unfortunately, the designs of bicycle seats, although "streamlined", have not evolved to provide the bicycle with the degree of comfort which is desired and needed with various styles of riding.

Such styles of riding referred to above include those wherein the rider is more disposed to rest his weight upon the pedals through his legs and feet than upon the seat through the buttocks region; those wherein the rider tends to thrust forwardly upon the handle bar through his arms and to press, primarily rearwardly, against the seat with the buttocks region; and those wherein the rider is more disposed to rest his weight primarily upon the seat.

Conventional bicycle seats or saddles are shaped to fit between the legs and in the crotch area of the bicycle rider. Because such seats are relatively uncomfortable and tend to abrade the legs of the rider during movement of the legs, efforts in the past have been made to change the various sizes and shapes of such types of seats and also to include various types of pads or springs. The problem with prior attempts at improving the structural design of the bicycle seat is that, while recognizing that in order to maximize the comfort of the seat it is desirable to uniformly distribute the weight of the rider over a larger area, such seats do not provide the rider with the degree of comfort which is needed and desired while being adaptable to different styles of riding.

The state of the art is exemplified in the following U.S. Patents: U.S. Pat. No. 544,625; U.S. Pat. No. 586,997; U.S. Pat. No. 619,179; U.S. Pat. No. 660,132; U.S. Pat. No. 4,108,462; U.S. Pat. No. 4,176,880; and U.S. Pat. No. 4,387,925.

While such prior art devices provide improvement in the area intended, there still exists a great need to provide a bicycle seat which provides comfort to the rider while accomodating different styles of use and having a construction which is relatively simple and inexpensive and readily interchangeable with standard bicycle seat mounting structures.

Accordingly, a principal desirable object of the present invention is to provide a bicycle seat that is well suited for different styles of riding while providing comfort to the rider.

Another desirable object of the present invention is to provide a bicycle seat construction which is simple and relatively inexpensive and is formed so as to be readily interchangeable with a standard bicycle seat found on any standard bicycle.

These and other desirable objects and advantages of the invention will in part appear hereinafter and will in part become apparent after consideration of the specification with reference to the accompanying drawings.

SUMMARY OF THE INVENTION

The present invention discloses an improved bicycle seat which is useful to various styles of riding while providing improved comfort for the bicycle rider. The bicycle seat comprises a seat means formed of an elongated integral member having a top surface, a bottom surface, a center portion and a pair of lateral end portions. The top surface is contoured to have a pair of concave portions for supporting engagement with each of a bicycle rider's buttocks. The bicycle seat also includes a seat supporting means comprising a pair of frame members. Each of the frame members is a mirror image of the other and includes a u-shaped rod member having a pair of generally parallel laterally extending leg portions for supporting engagement with the bottom surface of the seat means and a closed end portion bent downwardly and generally perpendicular to the leg portions to provide a pair of support members. Attaching means are provided for releasably attaching each of the u-shaped rod members in supporting engagement with the bottom surface of the seat member. The supporting members are laterally adjustable as well as constructed and arranged for attachment to a standard bicycle seat mounting apparatus. In one embodiment of the invention the seat means is provided with a pad or cover.

BRIEF DESCRIPTION OF THE DRAWINGS

For a fuller understanding of the nature and desired objects of the invention, reference should be had to the following detailed description taken in connection with the accompanying drawings wherein like reference characters denote corresponding parts throughout the several views and wherein.

DETAILED DESCRIPTION OF PREFERRED EMBODIMENT(S)

Figure 1:
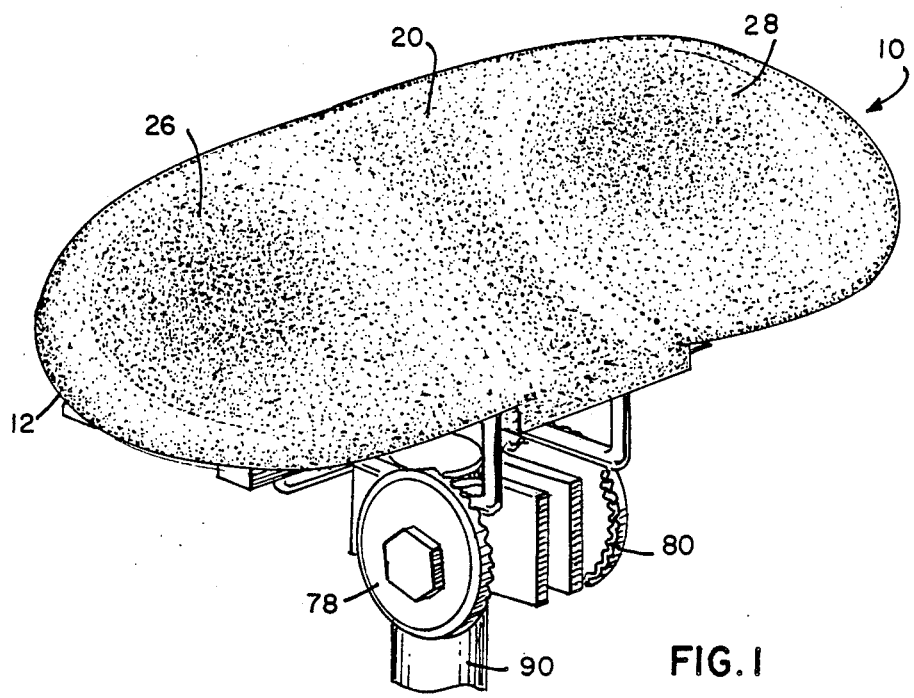
FIG. 1 is a perspective view of the bicycle seat of the present invention as it is attached to a standard bicycle mounting clamp.

Referring now to the drawings and more particularly to FIGS. 1–5, there is illustrated a bicycle seat in accordance with the present invention. The bicycle seat indicated generally at 10 comprises a seat portion 12 and a support portion 14. The seat portion 12 is formed of an elongated integral member having a top surface 16, a bottom surface 18, a center portion 20, and lateral end portions 22 and 24. The top surface 16 of the elongated member 16 is provided with a pair of generally concave portions 26 and 28 which are shaped to conform generally to the buttocks of the human anatomy. In a preferred embodiment, the center portion 20 is generally concave but preferably less concave than the lateral concave portions 26 and 28. The elongated seat member 12 preferably has an elongated oval or ellipsoidal configuration in the horizontal plane transversely of the conventional bicycle frame. The seat member 12 is preferably formed of a substantially rigid material such as, for example, polycarbonate. While other materials such as wood, metal and combinations thereof can be used, plastic materials can be readily molded or laminated to the desired configuration and are therefore preferable. In the preferred embodiment, the bottom surface 18 of the seat member 12 is provided with a center pedestal portion 30 and rib members 32a, 32b, 34a and 34b which extend laterally along the longitudinal length of the bottom surface 18. The pedestal and rib members provide a base for attaching the support portion 14 while minimizing the amount of material required to form the seat member 12 as well as the weight, and at the same time maintaining the strength of the seat member 12.

Figure 2:
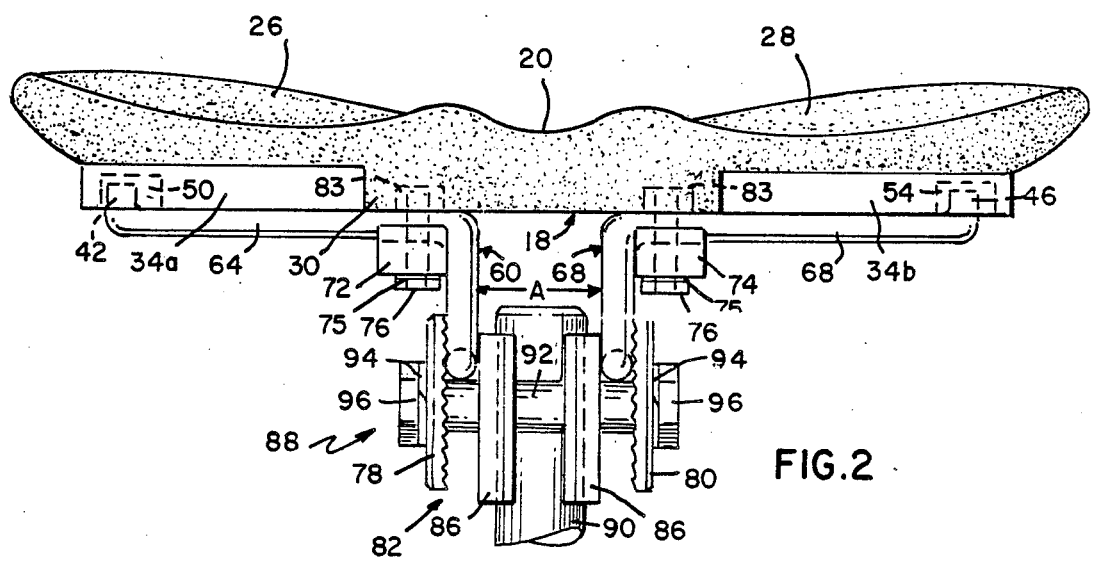
FIG. 2 is a front elevational view of the bicycle seat of FIG. 1.

The seat supporting portion or structure 14 comprises a pair of u-shaped rod members 36 and 38 which support the seat member 12. The u-shaped rod members 36 and 38 are preferably formed of an integral length of metal having the open end portions bent upwardly to form pairs of finger members 40, 42, 44 and 46 which provide supporting engagement with the bottom surface of the seat member 12 within the slot or apertures 48, 50, 52 and 54 of the respective rib members 32a, 32b, 34a and 34b. The closed-end portions 56 and 58 of rod members 36 and 38 respectively are bent or formed downwardly to provide a pair of support members illustrated generally at 60 and 62. The finger members and support members are connected by the elongated base portions 64, 66, 68 and 70 of rod members 36 and 38. The seat supporting structure assembly 14 further includes a pair of rod restrictor members 72 and 74, lock washers 75 and attaching bolts 76. The restrictor rods 72 and 74 and bolts 76 serve to releasably hold rod members 36 and 38 in supporting engagement with the rib members 32a, 32b, 34a and 34b with the finger members 40, 42, 44 and 46 inserted into the respective slots 48, 50, 52 and 54. The slots 48, 50, 52 and 54 permit lateral adjustment of the rod members 36 and 38 so that the space A between support members 60 and 62 (as best seen in FIG. 2) can be adjusted to the correct distance for attachment to the bicycle seat mounting clamps 78 and 80 of the bicycle seat mounting member indicated generally at 82. The bolts 76 are then tightened within the internally threaded members 83 to releasably secure the supporting structure 14 to the seat structure 12 to form the completed assembly of the bicycle seat 10. The bicycle seat 10 is then attached to the standard mounting member 82 which comprises clamps 78 and 80, pivotal members 84 and 86 which are provided with internal mating locking teeth (not shown) to provide pivotal movement of the bicycle seat as is well known, and socket 88 for securing the mounting member 82 to bicycle frame seat shaft 90. The mounting member 82 is secured to shaft 90 by means of a conventional bolt 92, lock washers 94, and locking nuts 96 on each side.

Figure 6:
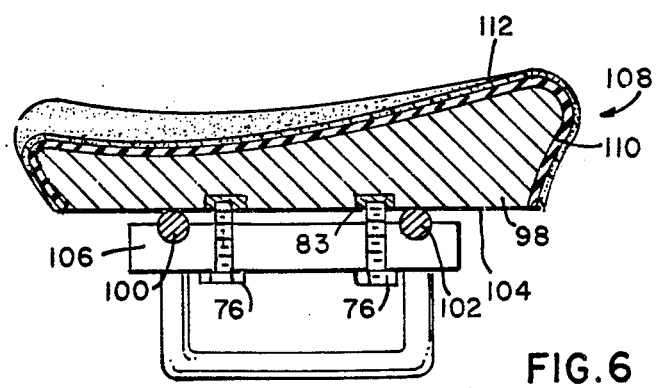
FIG. 6 is a sectional view of an alternate embodiment of the bicycle seat of the present invention including a pad means attached to the seat.

Referring now to FIG. 6, there is illustrated an alternate embodiment of the invention wherein the elongated seat member 98 is formed without the ribs 32a, 32b, 34a and 34b described with respect to FIGS. 1-5. In this embodiment the seat member is formed having a thickness substantially equal to thickness of the seat member 16 including the rib thickness thereby providing sufficient thickness to receive the attaching bolts 76. In this embodiment the open end portions of rod members 100 and 102 are not bent upwardly to provide finger support members. The rods are releasably secured to the bottom surface 104 of seat member 98 by rod restrictors 106 in the same manner as described with respect to FIGS. 1-5. Additionally, in this embodiment, the seat member 98 is provided with a pad or cover means 108 which preferably includes an inner layer 110 formed of a resilient material such as, for example, polyurathane, a plastic foam, or sponge rubber material and an outer protective cover 112 which can be suitably formed of plastic such as polyurathane, polyvinyl chloride, or leather, the main requirements being that the material be flexible and substantially impervious to water. It is to be understood that the pad 108 can be formed of a single unitary structure of polyurathane, for example, and releasably secured to the seat member 98 by suitable attaching means such as mating velcro surfaces as is well known.

Figure 3:
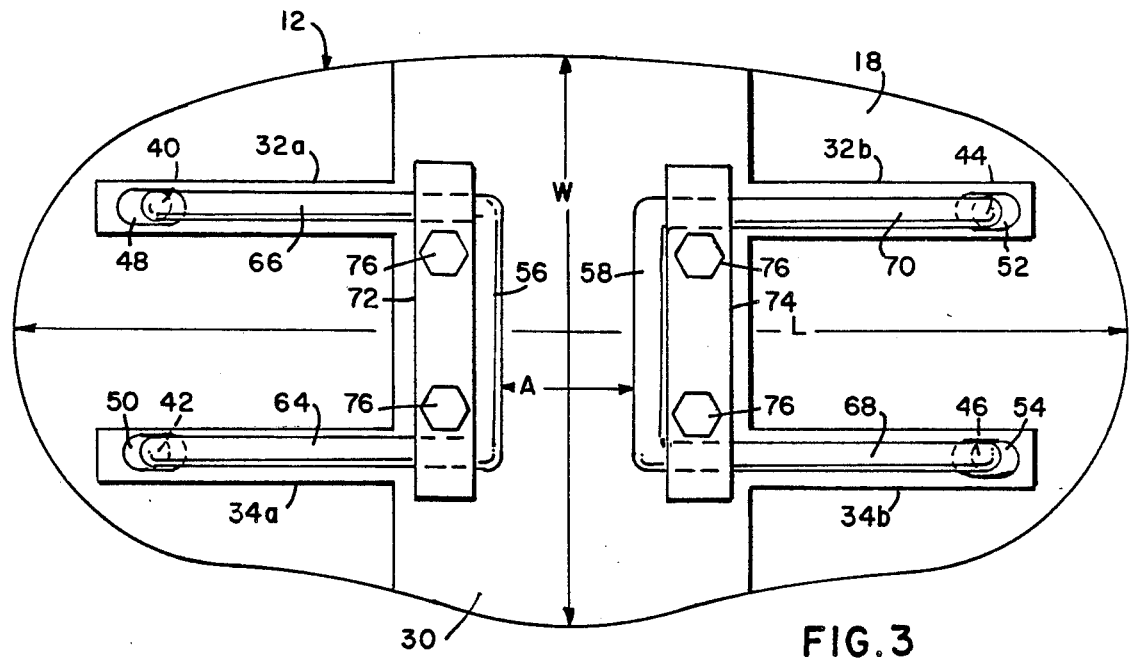
FIG. 3 is a bottom elevational view of the bicycle seat of FIG. 1.
Figure 4:
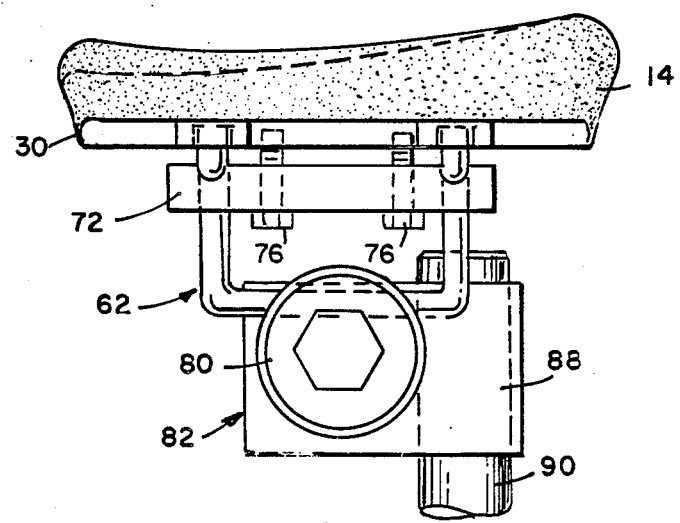
FIG. 4 is a side plan view of the seat of FIG. 1.
Figure 5:
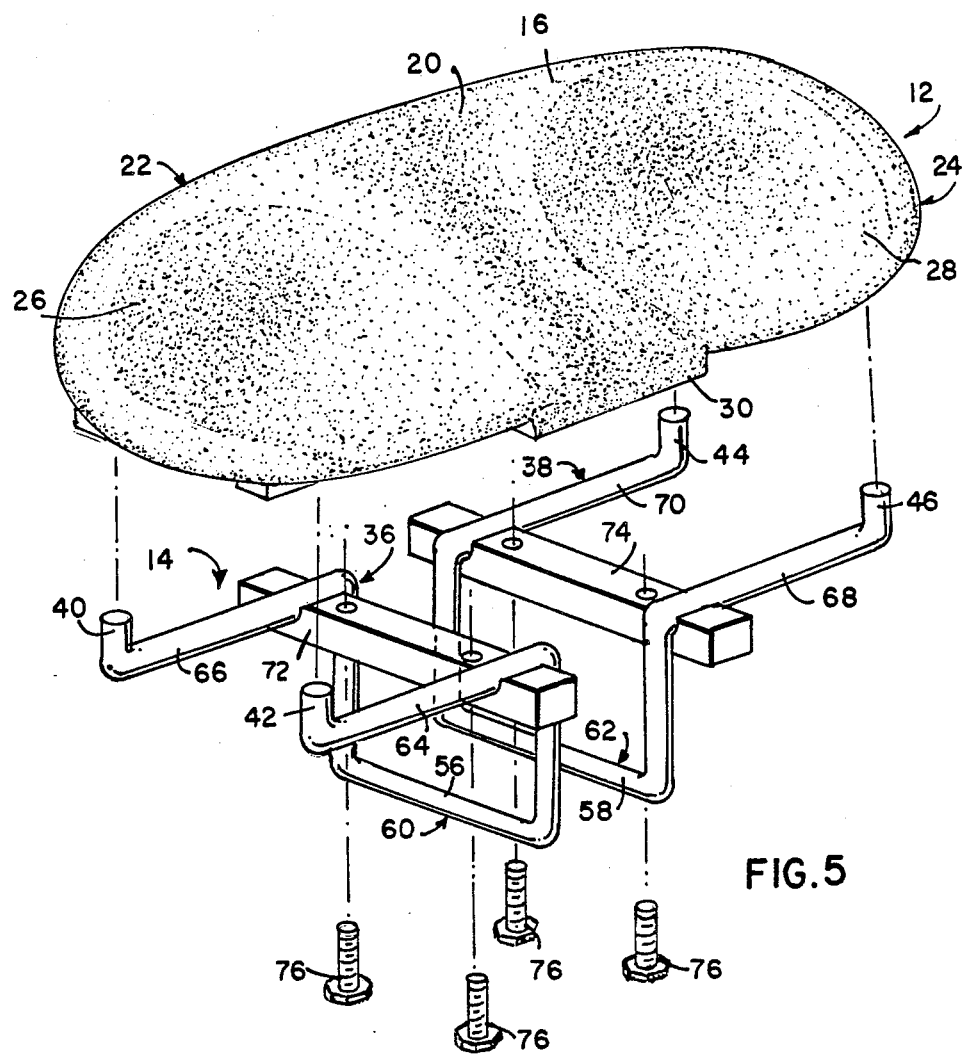
FIG. 5 is an exploded view of the bicycle seat showing its various component parts.

It has been found that the dimensions of the seat portion 12 (as best seen in FIG. 3) are preferably between about 8 to 12 inches in length as taken along the line L—L, and between about 3 to 6 inches in width as taken along the line W—W.

It is believed that the construction and configuration of the present invention provides a bicycle seat which is simple and relatively inexpensive, is adaptable to various styles of riding while providing comfort to the rider, and is formed so as to be readily interchangeable with standard bicycle seat mountings found on conventional bicycles. It has been found that the elongated elipsoidal configuration with the lateral concave portions provides a bicycle seat which provides comfort to a wide variety of riders and which does not concentrate the weight of the rider in one small area.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

I claim:
1. A bicycle seat comprising:
   a seat means formed of an elongated integral member having a top surface, a bottom surface, a center portion and a pair of lateral end portions;
   said elongated member having a generally oblate ellipsoidal configuration with a major length and a minor length, said major length being transversely positioned to a bicycle frame when said seat means is mounted thereon;
   said top surface being contoured to have a pair of concave portions for supporting engagement with each of a bicycle rider's buttocks;
   a seat supporting means comprising:
   a pair of frame members;
   each of said frame members being a mirror image of the other;
   each of said frame members comprising:
   a u-shaped rod member having a pair of generally parallel laterally extending leg portions for supporting engagement with the bottom surface of said seat means and a closed end portion bent downwardly and generally perpendicular to said leg portions to provide a pair of support members; and means for attaching each of said u-shaped rod members in supporting engagement with the bottom surface of said seat member.

2. The bicycle seat of claim 1 wherein said rigid seat member is formed of a plastic material.

3. The bicycle seat of claim 1 further comprising means for pivotally connecting said support member to a conventional bicycle frame.

4. The bicycle seat of claim 1 further comprising pad means disposed upon the top surface of said seat means.

5. A bicycle seat comprising:
a seat means formed of an elongated integral substantially rigid member having a top surface, a bottom surface, a center portion and a pair of lateral end portions;
said elongated member having a generally oblate ellipsoidal configuration with a major length and a minor length, said major length being transversely positioned to a bicycle frame when said seat means is mounted thereon;
said top surface being contoured to have a pair of concave portions disposed in said lateral portions for supporting engagement with each of a bicycle rider's buttocks;
a seat supporting means comprising:
a pair of frame members;
each of said frame members being a mirror image of the other;
each of said frame members comprising:
a u-shaped integral rod member having a pair of generally parallel laterally extending leg portions for supporting engagement with the bottom surface of said seat means and a closed end portion bent downwardly and generally perpendicular to said leg portions to provide a pair of support members; and
means for releasably attaching each of said u-shaped rod members in supporting engagement with the bottom surface of said seat member whereby said support members are laterally adjustable so as to be positioned in a desired spaced relationship to each other adjacent center portion of said seat means.

6. The bicycle seat of claim 5 wherein said rigid seat member is formed of a plastic material.

7. The bicycle seat of claim 5 further comprising means for pivotally connecting said support member to a conventional bicycle frame.

8. The bicycle seat of claim 5 further comprising pad means disposed upon the top surface of said seat means.

9. A bicycle seat comprising:
a seat means formed of an elongated integral member having a top surface, a bottom surface, a center portion and a pair of lateral end portions;
said top surface being contoured to have a pair of concave portions for supporting engagement with each of a bicycle rider's buttocks;
a pair of rib members extending in generally parallel spaced relationship across the bottom surface of said seat means and a pair of slot means disposed in the lateral end portions of each of said rib members;
a seat supporting means comprising:
a pair of frame members;
each of said frame members being a mirror image of the other;
each of said frame members comprising:
a u-shaped integral rod member having the open end portions bent upwardly to form a pair of finger means for supporting engagement with the bottom surface of said seat means within said slot means and the closed end portion bent downwardly to provide a pair of support members;
said end portions and said support members being connected by elongated base portions; and
means for releasably attaching said base portions of each of said u-shaped rod members to the bottom surface of said rib members whereby said support members are positioned in adjustable spaced relationship to each other adjacent center portion of said seat means.

10. The bicycle seat of claim 9 wherein said rigid seat member is formed of a plastic material.

11. The bicycle seat of claim 9 further comprising means for pivotally connecting said support member to a conventional bicycle frame.

12. The bicycle seat of claim 9 further comprising pad means disposed upon the top surface of said seat means.

13. The bicycle seat of claim 12 wherein said pad means comprises an inner layer of resilient material and an outer layer of fluid impervious material.

14. The bicycle seat of claim 12 wherein said pad means is releasably secured to the top surface of said seat means.

15. A bicycle seat comprising:
a seat means formed of an elongated integral member having a top surface, a bottom surface, a center portion and a pair of lateral end portions;
said top surface being contoured to have a pair of concave portions for supporting engagement with each of a bicycle rider's buttocks;
a pair of rib members extending in generally parallel spaced relationship across the bottom surface of said seat means;
a seat supporting means comprising:
a pair of frame members;
each of said frame members being a mirror image of the other;
each of said frame members comprising:
a u-shaped integral rod member having the open end portions extending laterally to form a pair of lateral support portions for supporting engagement with the bottom surface of said rib means and the closed end portion bent downwardly to provide a pair of vertical support members; and
means for releasably attaching said lateral support portions of each of said u-shaped rod members to the bottom surface of said rib members whereby said vertical support members are positioned in adjustable spaced relationship to each other adjacent the center portion of said seat means.

* * * * *